United States Patent [19]

Arvanitakis

[11] 4,184,955
[45] Jan. 22, 1980

[54] METHOD AND APPARATUS FOR CLARIFYING LIQUIDS THROUGH SETTLING

[76] Inventor: Kostas S. Arvanitakis, 14945 S. Dogwood Ave., Orland Park, Ill. 60462

[21] Appl. No.: 838,753

[22] Filed: Oct. 3, 1977

Related U.S. Application Data

[63] Continuation-in-part of Ser. No. 618,137, Sep. 30, 1975, abandoned.

[51] Int. Cl.² ............................................. B01D 21/06
[52] U.S. Cl. ................................... 210/83; 210/521; 210/522; 210/525; 210/535; 210/540
[58] Field of Search .................. 210/83, 84, 407, 408, 210/413, 513, 521, 522, 523, 524, 525, 519, 65, 66, 520, 535, 540

[56] References Cited

U.S. PATENT DOCUMENTS

| | | | |
|---|---|---|---|
| 719,761 | 2/1903 | Delmouly | 210/522 |
| 1,030,271 | 6/1912 | Arbuckle | 210/521 |
| 2,624,463 | 1/1953 | Freese | 210/519 |
| 3,532,218 | 10/1970 | Von Blottnitz et al. | 210/519 |
| 3,705,649 | 12/1972 | Arvanitakis | 210/66 |
| 3,915,858 | 10/1975 | Condolios | 210/521 |

*Primary Examiner*—Frank Sever
*Attorney, Agent, or Firm*—August E. Roehrig, Jr.

[57] ABSTRACT

A system for gravitationally separating suspended solids material from contaminated liquid through a plurality of concentric upwardly diverging frusto-conical sections, collecting the contaminants removed from the liquid and conveying them from the system in a semi-dry state for reuse or disposal.

20 Claims, 4 Drawing Figures

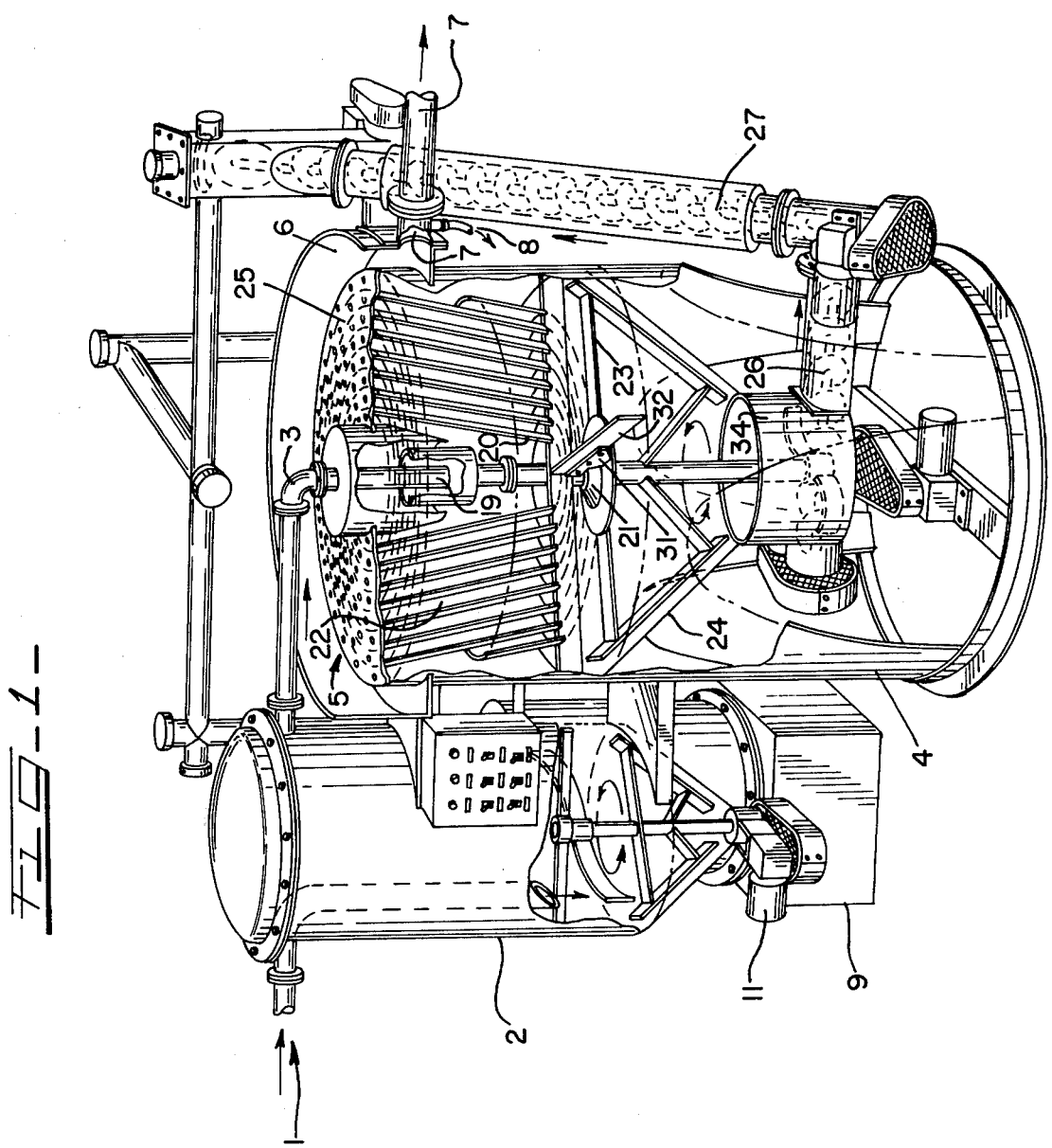

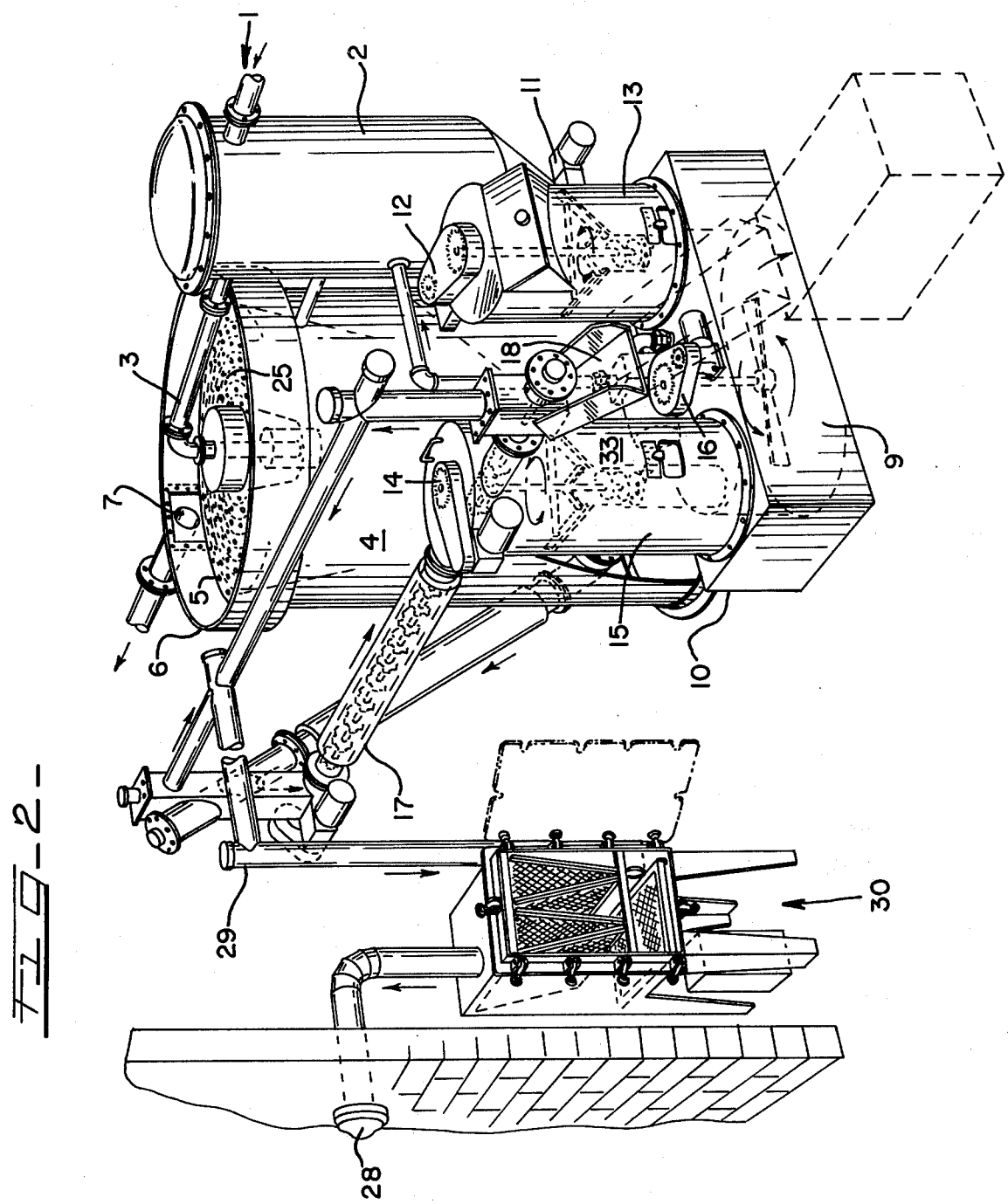

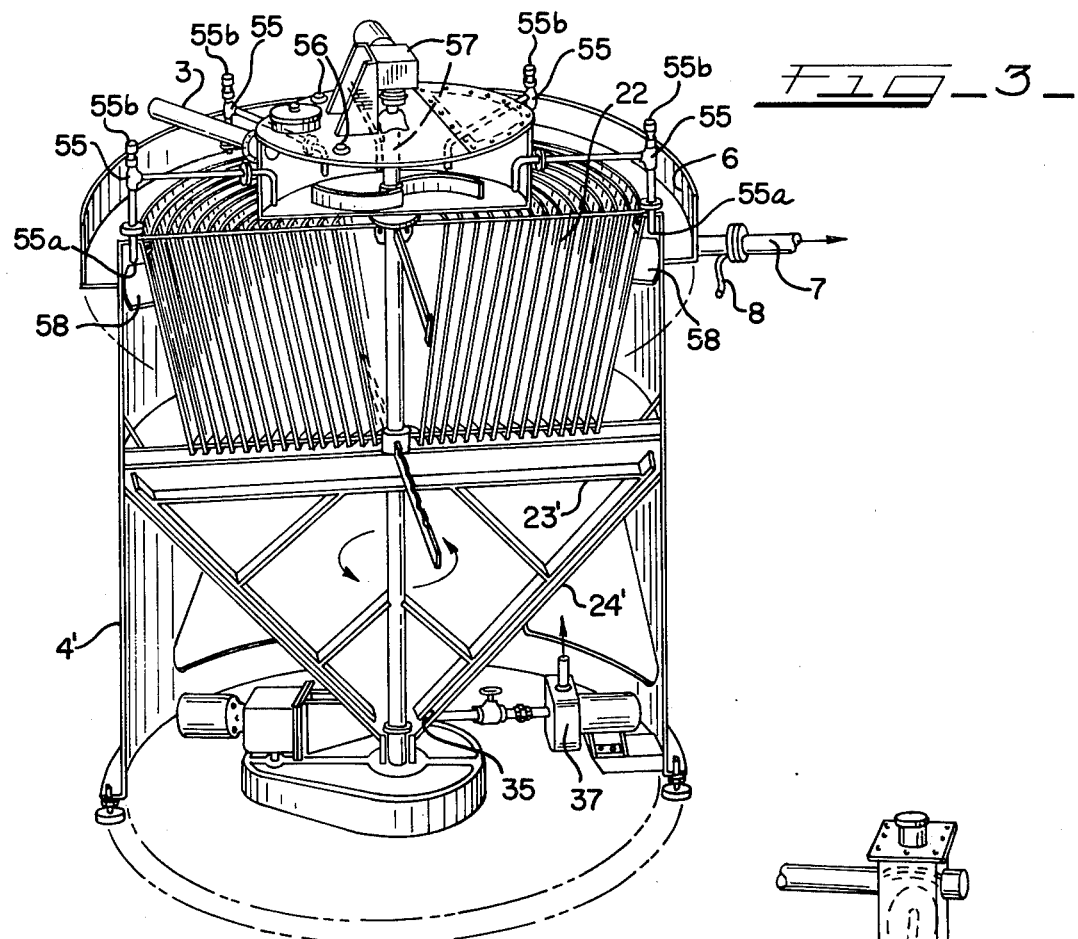
FIG_3
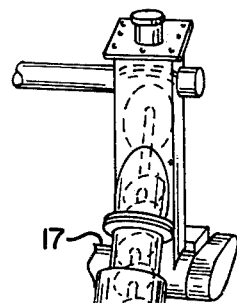
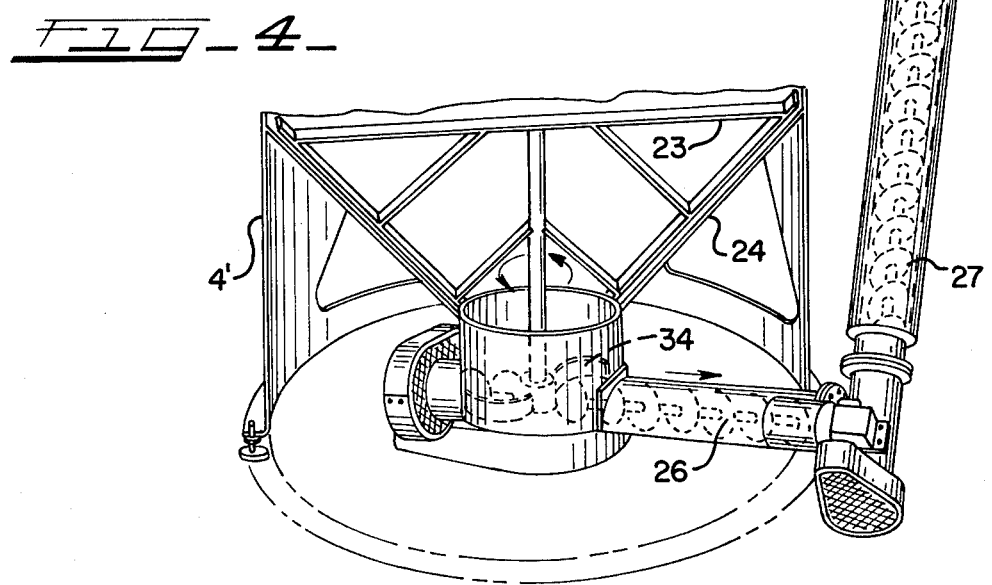
FIG_4

4,184,955

METHOD AND APPARATUS FOR CLARIFYING LIQUIDS THROUGH SETTLING

BACKGROUND OF THE INVENTION

This application is a continuation-in-part of application Ser. No. 618,137, filed Sept. 30, 1975, and now abandoned.

This invention relates in general to an improved method and apparatus for clarifying liquids and, in particular, to a settling clarifier system which removes solids material from a contaminated liquid and conveys them from the system where they may be reclaimed or disposed.

More specifically, this invention relates to a settling clarifier for removing solids material suspended in a liquid through the introduction of chemicals and inert solids to accelerate the settling rate or precipitation of the solids material from the liquid.

Settling clarifiers for clarifying liquid by gravitationally removing the suspended solids from the liquid are used in many applications where it is desired to remove solids and chemical contaminants from the liquid prior to discharge. However, such settling clarifiers are generally unsatisfactory due to the manner of solids material accumulation on the bottom of the clarifier chamber. If the accumulated solids material is not removed at proper intervals, the separated liquid is of a poor and non-uniform quality.

Another problem encountered is removal of sludge or solids material from the chamber. Since the sludge is not dense or concentrated, the bottom flow from such clarifiers has to go through an additional dewatering or thickening apparatus to remove a sufficient amount of liquid from the sludge material before it can be removed from the clarifier. The sludge material, after passing through the thickening device, still is not sufficiently liquid free to be used or disposed of in an economical manner.

A further problem encountered with prior art settling clarifiers is the settling rate of its solids material removed from its contaminated liquid. Since the solids material are suspended in the liquid, any turbulence of the liquid substantially increases the time required for removal of the suspended solids material. The turbulence within the clarifier sometimes raises solids materials which have already been settled out from the liquid to be resuspended within the liquid, thereby greatly reducing system efficiency. Therefore, it is important to minimize and eliminate any turbulence within the clarifier chamber both when introducing unclarified liquid into the chamber and while removing the accumulated solids material from the bottom of the clarifier chamber.

SUMMARY OF THE INVENTION

It is, therefore, an object of this invention to improve liquid/solid separation systems.

Another object of this invention is to improve liquid/solid separation systems by accelerating the settling rate of solids from the material thereby reducing the size of the clarifier and discharging a more stable uniform quality of clarified liquid.

A further object of this invention is to introduce predetermined materials into the system for increasing the settling rate and controlling the discharge.

Yet another object of this invention is to minimize and/or eliminate turbulence within a clarifier chamber during introduction of unclarified liquid thereinto and removal of the contaminants therefrom.

These and other objects are obtained in accordance with the present invention wherein there is provided a system for gravitationally separating suspended solids material from contaminated liquid through a plurality of concentric upwardly diverging frusto-conic sections, collecting the contaminants removed from the liquid and conveying them from the system in a semi-dry or dry state for reuse or disposal.

DESCRIPTION OF THE DRAWINGS

Further objects of this invention, together with additional features contributing thereto and advantages accruing therefrom, will be apparent from the following description of two embodiments of the invention when read in conjunction with the following drawings, wherein:

FIG. 1 is a frontal, perspective view of one embodiment of the invention of this application with portions removed to better illustrate the manner in which suspended particles are collected and gravitationally settled from the contaminated liquid and conveyed from the system for reuse or disposal;

FIG. 2 is a perspective view from the opposite side of the system to better illustrate the manner in which solids material removed from the liquid may be reused in the system and additional material may be added to the liquid for accelerating the gravitational settling rate of the solids material.

FIG. 3 is a front, perspective view of another embodiment of the clarifier shown in FIGS. 1 and 2 with portions removed to illustrate the internal parts thereof; and FIG. 4 is a frontal, perspective view of an alternative configuration of the bottom portion of the clarifier illustrated in FIG. 3.

DESCRIPTION OF THE PREFERRED EMBODIMENTS

Prior to introducing contaminated liquid into the system, body feeders (shown in FIG. 2 and described in detail hereafter) are filled with appropriate materials which will be described with the operation of the feeders. The contaminated liquid bearing suspended solids material is pumped or fed by gravity through an inlet 1 into a mixing tank 2 until the mixing tank is filled to overflow causing the liquid to discharge from the mixing tank into a clarifier inlet 3. A drive motor system 11, of mixing tank 2, is energized to drive a mixer, shown as a scraper and mixing paddle of a type known in the art, to continuously agitate the contents of the tank 2 thereby preventing the suspended solids from settling in the tank. The effluent is continuously passed to a clarifier 4 through the inlet 3 into a turbulence suppressor 19 positioned adjacent the inlet 3 to fill the inner chamber. A series of upwardly diverging frustoconic sections 22 are carried within the chamber and positioned to diverge upwardly towards a flow-control plate 25 which is secured to the upper ends of the frusto-conic sections closing their upper ends except for a plurality of apertures formed in plate 25 for a purpose to be hereinafter described in detail. The lower ends of the frusto-conic sections 22 are open so that the liquid which overflows the turbulence suppressor 19 will pass downwardly within the innermost frusto-conic section 20 and be deflected by a deflector 21, suitably mounted to the turbulence suppressor support. The deflector is used so that the liquid will rise uniformly upwardly between the concentric frust-conic sections 22 and the sludge in a bottom frusto-conic section 24 will not be disturbed.

As the liquid rises between the frusto-conic sections to fill the chamber the solids material will gravitationally settle from the liquid. Due to the outward diverging of the frusto-conic sections in the upper direction, this solids material will quickly contact the surfaces of the frusto-conic sections causing agglomeration of the solids material thereby increasing the speed in which the solids material settles from the liquid and the amount of material that is removed. The solids material on the inner surfaces of the frusto-conic sections increases due to the material agglomeration and as the solids become more dense they slide off the inner surfaces into the bottom frusto-conic section 24 of the clarifier where they accumulate. In some applications wherein the solids have a tendency to pack on the inner surfaces of the concentric frusto-conic sections, a suitable vibration system is employed so that the frusto-conic sections are shaken to prevent any build-up of solids and to insure that the solids material will be removed to settle onto the chamber bottom.

To further accelerate settling, the flow-control plate cover 25 encloses the upper surface of the clarifier chamber. A series of apertures 25a formed therein are sized to create a back pressure on the liquid passing therethrough which increases the settling rate of the suspended solids. When the liquid passed out through the apertures 25a in the flow-control plate 25 it will flow into a trough 6 and out a discharge outlet 7 for disposal or further treatment.

As the suspended solids material settles from the contaminated liquid onto the concentric frusto-conic sections, the material agglomerates and slides from the frusto-conic sections into the frusto-conic section bottom 24 of the clarifier chamber. At intervals, depending upon the quantity of solids material in the contaminated liquid, a scraping and conveying system comprising a cone scraper 23, horizontal auger 26, flexible wiper 31 and a sludge feed blade 34 is activated. These elements are of the type disclosed in K. S. Arvanitakis, U.S. Pat. No. 3,705,648.

When scraping and auger systems are activated the cone scraper 23 slowly rotates (approximately ½-1 RPM) scraping the inner peripheral surface of the cone-shaped clarifier bottom 24 preventing any sludge build-up and feeding the accumulated sludge to the sludge feed blade 34 in the chamber bottom and into the horizontal auger 26 for transfer. The deflector 21, carried by the scraper 23, rotates with the cone scraper against the flexible wiper 31 (which is fixed to prevent rotation) preventing any sludge build-up on the deflector. The slow revolution of the cone scraper prevents any turbulence in this portion of the clarifier chamber which may cause resuspension of the solids.

As the sludge is fed from the chamber bottom by the sludge feed blade 34 to conveyor 26 it passes into a heated upwardly inclined, auger conveyor 27 wherein the sludge is heated and conveyed upwardly to a refeed auger conveyor 17 for conveying the dried sludge to the body feeder 15 to maintain this feeder full. The heat source for the inclined auger 27 is activated prior to energizing the scraper and conveyor system to properly heat the sludge and evaporate any liquid contained therein. An exhaust fan 28 is also energized to transfer vapors through exhaust piping 29 and air filter 30 which traps any particulate matter that might be carried along with the vapors. The heating system for the inclined auger and the exhaust fan are on continuously during system operation.

As the sludge is conveyed into the heated inclined auger conveyor 27, the solids material is dried due to the heating of the auger chamber and passes from the top of the auger 27 into the refeed auger conveyor 17. The refeed auger conveyor 17 conveys the dried solids material back to the body feeder 15. A portion of the refeed auger conveyor 17 passes through the upper part of the body feeder tank 15 and has openings along a portion of the auger tube bottom to allow the dry solids material to drop into the feeder tank 15 until such time as it is filled up to the level of the auger 17. When the secondary feeder tank is filled, the excess dried solids are carried out through the secondary feeder to the discharge chute 33 for disposal. In this manner, after the initial charge of materials has been placed into the feeder 15 prior to start-up operation of the clarifier system, the solids material removed from the contaminated or unclarified liquid will adequately replenish the supply for addition into the mixing tank 9.

The body feeder 15 is carried on mixing tank 9 and positioned to deposit material into the tank. The initial change of inert solids materials in powder form, such as diatomaceous earth, acts as a carrying agent in the clarifier. The apparatus utilized in the body feeder 15 to deposit this predetermined amount of inert solids material is the same as that utilized in the feeder 13.

In order to maintain a predetermined pH of the effluent discharge, a dry material feeder 13, shown in FIG. 2, is carried on a mixing tank 9 and positioned to deposit material from the feeder into the tank. The feeder is filled with pre-selected proper chemicals for treating the contaminated liquid to control the pH value of the effluent discharge and a feeder drive 12, activated by a pH sensing element (not shown) installed on the discharge outlet 7 maintains the predetermined setting. A scraper and auger system is used for depositing the predetermined amount of materials into the feeder mixing tank 9 and is of the type disclosed in K. S. Arvanitakis, U.S. Pat. No. 3,705,648, whereby the amount of material deposited in the mixing tank 9 may be increased or decreased in response to the pH sensor to maintain effluent conditions.

The materials from feeders 13 and 15 are mixed in the feeder mixing tank 9 and pumped into the mixing tank 2 through a feeder pump 18. The feeder 15 and feeder pump 18 are continuously in operation when the clarifier is operating, while feeder 13 is actuated only in response to the pH sensor in the effluent line. In order to maintain the liquid level in the feeder mixing tank 9 at a predetermined level, a suitable liquid-level float switch 10 controls the return of a portion of the effluent discharge from outlet 7 through a make-up liquid line 8 coupled in fluid communication to the feeder mixing tank 9.

As previously discussed, it is desirable to avoid turbulence in the clarifier chamber 4 and to this end the input of influent in the embodiment shown in FIGS. 1 and 2 is delivered in a particular manner to achieve this objective. The inlet pipe 3 extends beneath the level of the liquid contained in the clarifier chamber and the influent from the inlet pipe 3 is discharged into a submerged closed-end turbulence suppressor cup 19 with a closed-end turbulence suppressing hood 19a positioned coaxially about the turbulence suppressor cup 19 with the open end thereof extending beneath the liquid level to a position lower than the discharge position or open end of the turbulence suppressor 19. Influent from inlet line 3 is discharged into the closed portion of the turbulence suppressor cup 19 and flows upwardly out from the cup into the turbulence suppressing hood 19a which surrounds the cup 19 such that the influent must flow downwardly out from the discharge end towards the deflector 21. As best shown in FIG. 1, the lowermost or discharge portion of the turbulence suppressor hood 19a is tapered inwardly to direct any influent discharge current to the deflector plate 21.

Referring now to the embodiment of the clarifier chamber shown in FIG. 3, like reference numerals indicate parts corresponding to those of the embodiment disclosed with reference to FIGS. 1 and 2. A series of concentric frusto-conic sections 22 are positioned in the clarifier chamber 4' in the manner previously disclosed. The bottom portion of the chamber 4' is formed as a frusto-conic section 24' which extends to form substantially an inverted cone with the scraper 23' extending substantially the entire depth of the cone to function in the manner previously described. A discharge port 35 is formed near the apex of the cone 24' through which accumulated sludge is periodically removed by means of a discharge pump 37. As shown in FIG. 4, the bottom of this embodiment of clarifier chamber 4' can be formed the same as described with reference to FIGS. 1 and 2 if it is desired to obtain a dry or semi-dry solids waste discharge.

The embodiment illustrated in FIG. 3 is especially well adapted for use with high volume influent flow rate and to this end the upper portions of the frusto-conic sections 22 are not closed by a flow control plate cover 25, but are open to permit the liquid in the clarifier chamber 4' to flow out from the frusto-conic sections 22 into the discharge or effluent trough 6 and out from the discharge outlet 7 at the same rate as influent is introduced through inlet 3.

The influent discharge inlet 3 delivers unclarified liquid into a closed pre-mix tank 50 which is supported above the uppermost portions of the frusto-conic sections 22. The pre-mix tank 50 is entirely closed but is in fluid communication with the interior of clarifier chamber 4' through a series of influent distributors 55 spaced equidestantly about the periphery of the uppermost end of the chamber 4'. Ports 56 are provided in the pre-mix tank 50 for addition of chemicals or other additives as desired and depending upon the nature of the influent and the desired effluent or solids material. A mixer and drive system 57 are carried on the pre-mix tank 50 to agitate the contents thereof for preventing the solids materials from settling in the tank prior to passing into the clarifier chamber 4' through the influent distributors 55.

In order to prevent turbulence in the clarifier chamber 4', the influent is discharged into the pre-mix tank 50. The influent distributors 55 extend from the tank 50 above the uppermost portion of the frusto-conic sections 22 to beneath the liquid level of the clarifier chamber 4' during normal operation to form a fluid coupling therebetween. The discharge outlet 55a of the influent distributors is positioned adjacent the outer periphery of the clarifier chamber to discharge influent against a turbulence-suppressing baffle plate 58 secured in a position between the inner walls of the clarifier chamber 4' and the back side of the outermost outwardly diverging frusto-conic section 22. In this manner the influent discharge first passes into the pre-mix tank 50 which reduces turbulence and then is passed into the clarifier chamber 4' through the influent distributors 55 which discharge the influent beneath the liquid level onto turbulence-suppressing baffles 58 carried behind the active surfaces of the frusto-conic sections 22. Each of the influent distributors 55 has an anti-siphon vacuum breaker 55b to prevent influent flow variations from effecting a siphon action.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. Apparatus for gravitationally removing suspended solids material from contaminated liquid comprising
    container means for holding a quantity of contaminated liquid having solids material suspended therein,
    a plurality of concentric frusto-conic sections carried within said container means and positioned to receive contaminated liquid for settling and accumulating solids material from the contaminated liquid,
    inlet means having a discharge outlet for introducing contaminated liquid having solids material suspended therein into said container means,
    said discharge outlet extending within said container means to a position beneath the level of liquid contained therein to introduce contaminated liquid into said container means at a point beneath the level of liquid discharged from said container means,
    turbulence suppressing means positioned in operative contact with said inlet means for quiescing the discharge of contaminated liquid into said container means,
    means for creating a back pressure on liquid passing from said inlet means to said concentric frusto-conic sections for facilitating settling of solids material thereon, and
    means for removing the solids material settled and accumulated on said concentric frusto-conic sections from said container means and discharging the liquid clarified thereby.

2. The apparatus of claim 1 wherein said plurality of concentric frusto-conic sections diverge outwardly and upwardly from the inlet of said container means.

3. The apparatus of claim 2 wherein said means for removing the solids material includes
    scraper means carried within said container means at a position beneath said plurality of frusto-conic sections in operative contact with the bottom of said container means to remove solids material accumulated thereon, and
    discharge means adjacent said scraper means for removing the accumulated solids material from said container means.

4. The apparatus of claim 3 wherein said discharge means comprises a pump.

5. The apparatus of claim 3 wherein said discharge means includes a heated auger conveyor for drying the solids material removed from said container means.

6. The apparatus of claim 1 wherein said turbulence suppressing means includes a turbulence suppressing cup positioned beneath the level of liquid discharge from said container means to directly receive the contaminated liquid introduced into said container means from said inlet means.

7. The apparatus of claim 6 wherein said turbulence suppressing means further includes a turbulence suppressing hood positioned concentrically about said turbulence suppressing cup and having a discharge opening extending lower than the discharge opening of said turbulence suppressing cup.

8. The apparatus of claim 7 further including a deflector plate positioned beneath the lowermost portion of said plurality of concentric frusto-conic sections and above the bottom of said container means to preclude liquid flow onto solids material accumulated on the bottom thereof.

9. The apparatus of claim 8 wherein the discharge opening of said turbulence suppressing hood is tapered to direct liquid to said deflector plate.

10. The apparatus of claim 8 further including scraping means positioned in operative contact with said deflector plate to remove solids material accumulated thereon.

11. The apparatus of claim 1 further including mixing means in fluid communication with said inlet means for adding materials to the contaminated liquid for controlling the characteristics thereof or the effluent therefrom.

12. The apparatus of claim 11 further including means for conveying the solids material removed from said container means into said mixing means for controlled reintroduction into the contaminated liquid.

13. The apparatus of claim 11 further including means for introducing a portion of the effluent discharged from said container means into said chamber in response to the level of liquid contained in said chamber.

14. The apparatus of claim 1 wherein said turbulence suppressing means comprises an enclosed chamber in fluid communication with said inlet means for directly receiving the contaminated liquid introduced therethrough, and influent distributing means in fluid communication with said enclosed chamber and said container means to discharge contaminated liquid thereinto at a point beneath the level of liquid discharged therefrom.

15. The apparatus of claim 14 wherein said influent distributing means discharges contaminated liquid into said container means at a position between the inner peripheral surface of said container means and the outer peripheral surface of the outermost concentric frusto-conic section.

16. The apparatus of claim 14 wherein said influent distributing means further include anti-siphon vacuum breakers to preclude removal of contaminated liquid from said chamber through siphon action.

17. The apparatus of claim 14 further including mixing means carried within said enclosed chamber to preclude solids material settling from the contaminated liquid contained therein.

18. A method of separating suspended solids material from a contaminated liquid comprising the steps of introducing contaminated liquid having solids material suspended therein into a container having a plurality of concentric frusto-conic sections supported therein, discharging the contaminated liquid being introduced into the container at a point beneath the level of liquid contained therein and beneath a discharge level of uncontaminated liquid passed from the container, imposing a predetermined back pressure on the contaminated fluid contained in the container to facilitate settling of the solids material suspended therein, suppressing turbulence within the container caused by introducing the contaminated liquid thereinto, gravitationally settling solids material suspended in the contaminated liquid onto the surfaces of the frusto-conic sections and passing uncontaminated liquid from the container, agglomerating the suspended solids material settled on the frusto-conic section surfaces, and removing the agglomerated solids material from said container.

19. The method of claim 18 wherein said step of removing the agglomerated solids material from the container includes draining and heating said solids material to effect the drying thereof.

20. The method of claim 19 further including the step of conveying the dried solids material removed from the container and introducing said solids material into the contaminated liquid prior to introducing the contaminated liquid into the container.

* * * * *